March 2, 1937. W. F. KANNENBERG 2,072,455
ELECTROOPTICAL SYSTEM
Filed Dec. 4, 1929
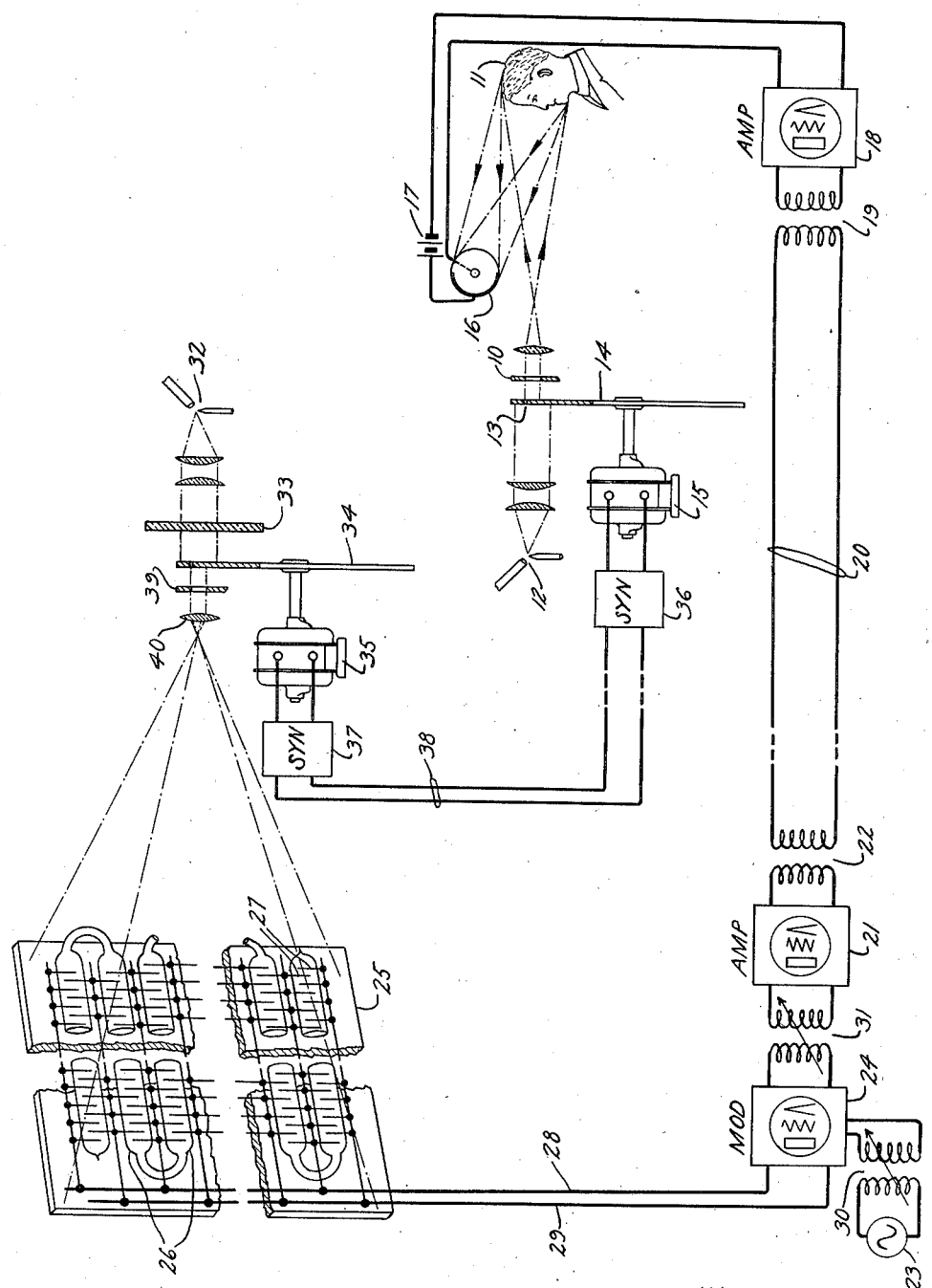
INVENTOR
W. F. KANNENBERG
BY
C. A. Sprague
ATTORNEY Patented Mar. 2, 1937

2,072,455

UNITED STATES PATENT OFFICE 2,072,455

ELECTROOPTICAL SYSTEM

Walter F. Kannenberg, Lyndhurst, N. J., assignor to Bell Telephone Laboratories, Incorporated, New York, N. Y., a corporation of New York Application December 4, 1929, Serial No. 411,426

23 Claims. (Cl. 178—6)

This invention relates to electro-optical systems, and more particularly to the production of television images.

An object of the invention is to simplify and cheapen the control of a source of light, such as may be used for the production of images under control of image currents, by the provision of simple means for suitably localizing at any instant, the light emitting portion of the light source.

It has heretofore been proposed to produce television images upon an image screen comprising a bank of light emitting elements by associating a source of image current with the light emitting elements in succession through a distributor which rotates in synchronism with a device which scans the elemental areas of a field of view in succession. A system of this type is disclosed, for example, in Patent 1,707,486 to Kishpaugh, April 2, 1929. The distributor employed in a system of this type has a large number of contacts and a large number of conductors are required for connecting the light emitting elements of the image screen with different distributor contacts, respectively. In accordance with the present invention the synthesis of a television image upon an image screen having a bank of light emitting elements is controlled without the use of a distributor for connecting the light emitting elements in succession with a source of image current.

In the illustrative embodiment of the invention herein shown and described a source of current having variations corresponding to the tone values of successively scanned elemental areas of a field of view, an image of which is to be produced, is permanently connected to the electrodes of all of the light emitting elements of an image producing apparatus, which may be a multi-electrode glow discharge lamp, and means are provided for projecting a beam of radiant energy, preferably of substantially constant intensity, upon said light emitting elements in succession to cause them to emit light in corresponding order. The electromotive force impressed across the electrodes of each light emitting element is preferably reduced to a low value for a brief interval following the period during which the beam of radiant energy is directed upon it to cause the emission of light from that element to be interrupted. This may be accomplished by connecting to the electrodes of the image producing device a modulated alternating current having a component which varies in accordance with the tone values of the field of view, an image of which is to be produced. With this arrangement each element of the image producing device will emit, at the time that the beam of radiant energy is projected upon it, light the intensity of which is determined by the amplitude of the modulated alternating current.

The drawing shows a television system which embodies the features of this invention.

Referring to the drawing, a field of view defined by the opening in the screen 10 and including the subject 11 is illuminated by light of substantially parallel rays from source 12 directed through the apertures 13 arranged along a spiral path near the periphery of a rotatable disc 14 which is driven by a motor 15. Due to the rotation of the disc 14, the elemental areas of the subject 11 are illuminated in succession along successive parallel lines. Light reflected from the subject 11 impinges upon one or more large aperture photoelectric cells 16, preferably of the type disclosed in Patent No. 1,942,501, granted Jan. 9, 1934 on an application of G. R. Stilwell, Serial No. 181,552, filed April 6, 1927, thus causing the photoelectric current flowing in the circuit including the photoelectric cell 16 and a battery 17 to vary in amplitude in accordance with the tone values of the successively scanned elemental areas of the field of view, an image of which is to be produced. A television system employing this type of apparatus at the transmitting station is described in detail in a copending application of F. Gray, Serial No. 227,649, filed October 21, 1927.

An image current made up of alternating current components of this photoelectric current after being amplified by the vacuum tube amplifier 18 is transmitted through transformer 19 and over a transmission line 20 to a receiving station where it is impressed upon the amplifier 21 through a transformer 22. This amplified image current together with alternating current from a source 23 of relatively high frequency with respect to the higher frequency components of the image current which are necessary for controlling the production of the image, are impressed on a modulator 24 to produce a modulated alternating current having a component which varies in accordance with the tone values of the successively scanned elemental areas of the field of view scanned at the transmitting station.

An image of the field of view scanned at the transmitting station is produced on an image screen comprising a bank of light emitting elements such as a multi-electrode glow discharge lamp 25 which is similar to that described in Patent No. 1,673,828 granted to H. E. Ives June 19, 1928. The lamp 25 may consist, for example, of a plurality of parallel glass tubes 26 filled with an inert gas such as neon, at a suitable pressure. Electrodes 27 of metal in the form of wires or plates, for example, are located within the tubular structure and are connected to leads extending through the glass. Alternate electrodes are connected together to one lead 28 of the source of modulated alternating current from the modulator 24 while the remaining electrodes are connected together to the other lead 29. The electromotive force of this modulated alternating current from the modulator 24 impressed on the electrodes of the image producing device 25 is adjusted by means of the variable couplings 30 and 31, or any other suitable devices so that the maximum electromotive force impressed upon the electrodes is below the electromotive force required for normally initiating a discharge between adjacent electrodes. The minimum peak amplitude of the electromotive force of the source of modulated alternating current from the modulator 24 impressed on the electrodes of the image producing device 25 is preferably so adjusted that a slight discharge takes place between adjacent electrodes upon which a beam of radiant energy of predetermined characteristics impinges when the amplitude of the image current transmitted over line 20 corresponds to the scanning of an elemental area, the tone value of which is very dark or black. The electric discharge between adjacent electrodes is initiated by projecting a beam of radiant energy upon them, or upon the space extending between them. By causing the beam of radiant energy to impinge upon successive elemental portions of the image producing device 25 in correspondence with the scanning of the elemental areas of the field of view at the transmitting station, an electric discharge takes place at different portions of the image producing device in succession and light of an intensity determined by a characteristic of the image current transmitted over line 20 is emitted from the elemental portions of the image producing device in succession to cause the production of an image. To initiate the electric discharge between adjacent electrodes located at different portions of the image producing device 25, radiant energy from source 32 may be projected through a suitable filter 33 upon an apertured disc 34 which is similar to the scanning disc 14 employed at the transmitting station and which is driven in synchronism therewith by the motor 35. The motors 15 and 35 at the two stations may be maintained in synchronism by the use of suitable synchronizing devices 36 and 37 associated with these motors respectively and connected together by the line 38. A suitable synchronizing arrangement is disclosed, for example in Patent No. 1,763,909, granted to H. M. Stoller and E. R. Morton, June 17, 1930. Due to the action of the rotating disc 34 a narrow beam of radiant energy, preferably of high intensity, is projected through the opening in the screen 39 and the lens 40 upon elemental portions of the image producing device 25 in correspondence and in synchronism with the scanning of the elemental areas of the field of view at the transmitting station. The source of radiant energy 32 may, for example, be a light source which emits energy at or slightly beyond the upper or lower limit of the visible spectrum, i. e., the ultra-violet or infra-red portions of the spectrum. When such energy is used the filter 33 preferably suppresses energy within the visible spectrum. On the other hand, energy within the visible spectrum may be employed and the filter 33 is then preferably such that light of only a small wave length band is transmitted. When energy in the visible range of the spectrum is employed, there is preferably provided between the image producing device 25 and the observer a filter which eliminates light of this small wave length range and transmits light of all other colors. If desired, energy of wave lengths considerably below the wave lengths of light, such as X-rays for example, and suitable means for directing this energy along different paths in succession may be employed.

After the emission of light from a particular elemental portion of the image producing device 25 has been initiated due to directing a beam of radiant energy upon this elemental portion of the image producing device, the emission of light from this elemental portion would continue when the beam of radiant energy no longer impinges upon it if no means were employed for interrupting the glow discharge between the electrodes of this portion of the image producing device. This result is not desired because not only would the glow produced at each elemental area be continuous, but the different elemental areas of the image producing device would all emit light of the same intensity at a particular instant, its intensity varying in accordance with the tone values of the successively scanned elemental areas of the field of view at the transmitting station. For this reason the electromotive force of a source of modulated alternating current is impressed on the electrodes of the glow discharge lamp so that the instantaneous value of the potential between two adjacent electrodes is reduced to zero after the beam of radiant energy traveling over a path intersecting the area defined by these electrodes is interrupted.

In some cases it may be desirable to coat each of the electrodes, or only alternate electrodes, with a material sensitive to light or other radiant energy to increase the sensitivity of the glow discharge lamp to the radiant energy directed upon it. The spacing of the electrodes of the image producing device and the gas pressure therein may be made such that a suitable voltage-current characteristic is obtained.

By the term "radiant energy of substantially constant intensity", as used herein, is meant radiant energy the energy content of which is not varied from time to time as is the case, for example, where the radiant energy is produced under control of an image current or other signaling current the amplitude of which varies in accordance with a signal. By the term "light" as used herein it is intended to include not only energy within the visible spectrum but also energy the wave length of which extends somewhat above or below the visible range.

What is claimed is:

1. Image producing apparatus comprising a light producing device, and means for causing light to be generated at and emitted from different portions of said device in succession to produce an image, said means comprising means for projecting a beam of energy of substantially constant intensity upon different portions of said device in succession and means for simultaneously impressing image potentials upon said device.

2. Image producing apparatus comprising a light emitting device, and means for causing said light emitting device to produce an image, said means comprising means for impressing upon said device image potentials having variations produced as the result of scanning a field of view, an image of which is to be produced and means for successively projecting upon different portions of said device a beam of radiant energy to cause only the portion upon which the beam impinges at any instant to emit light.

3. Image producing apparatus comprising a gaseous light producing device, and means for causing said device to generate and emit light from different portions thereof in succession to produce an image, said means comprising means for impressing thereon image potentials having variations produced as the result of scanning a field of view, an image of which is to be produced, and means for projecting a beam of radiant energy upon different portions of said device in succession.

4. Image producing apparatus comprising a light producing device, and means for causing light to be generated at and emitted from different portions of said device in succession to produce an image, said means comprising means for impressing image potentials upon said device, and means for projecting a beam of light from a source spaced from said device upon different portions of said device in succession.

5. Image producing apparatus comprising a light emitting device having a bank of electrodes surrounded by a gaseous atmosphere, and means for causing said light emitting device to produce an image, said means comprising means for impressing image potentials upon said electrodes and means for reducing the break-down potential between pairs of said electrodes in succession.

6. Image producing apparatus comprising a light emitting device having a bank of electrodes, and means, comprising a source of image potential and means for radiating energy through space to said electrodes, for jointly activating pairs of said electrodes in succession for causing said light emitting device to produce an image.

7. Image producing apparatus comprising a light generating device and means for causing adjacent portions of said device to generate light in succession to produce an image, said means comprising means for impressing image potentials upon said device and means for simultaneously projecting radiant energy successively upon different portions of said device.

8. Means for producing an image under control of alternating current modulated in accordance with the tone values of elemental areas of a field of view comprising a light emitting device energized by said modulated current, said device comprising a bank of electrodes, and means for projecting energy through space to said device to initiate discharges across pairs of said electrodes in succession.

9. The method of producing images electro-optically at a receiving station, which comprises simultaneously associating a plurality of light emitting elements of an image producing device with incoming image current and initiating the emission of light from said elements under control of locally produced radiant energy projected through space from outside said device.

10. In combination, a light emitting element, a source of alternating current having variations corresponding to the tone values of successively scanned elemental areas of a field of view, an image of which is to be produced, connected to said element for energizing it, a source of radiant energy, and means for intermittently projecting through space a beam of radiant energy from said source upon said light emitting element to cause it to emit light of an intensity determined by said variations of the alternating current from said source at intervals when subjected to the action of said radiant energy.

11. An electro-optical image producing system comprising a bank of light emitting elements, a source of alternating current having a component which varies in accordance with the tone values of successively scanned elemental areas of a field of view, an image of which is to be produced, means for connecting said bank of light emitting elements to said source of alternating current, a source of radiant energy, and means for projecting through space a beam of radiant energy from said souce upon said light emitting elements in succession to cause them to emit light and thereby produce an image of said field of view.

12. In an electro-optical image producing system, an image producing device comprising a bank of light emitting elements, a source of image current having variations corresponding to the tone values of successively scanned elemental areas of a field of view, an image of which is to be produced, connected to said elements, for controlling a characteristic of the light emitted from said image producing device, a source of radiant energy, and means for projecting through space a beam of radiant energy from said source upon the elements of said image producing device in succession for correspondingly controlling the time of illumination of said elements, respectively.

13. In an electro-optical image producing system, a source of alternating current, a source of image current, having variations corresponding to the tone values of elemental areas of a field of view, an image of which is to be produced, means for modulating said alternating current in accordance with said image current variations, a light generating image producing device energized by said modulated current, a source of radiant energy, and means for projecting through space a beam of radiant energy from said source upon different areas in succession of said image producing device for causing the emission therefrom of light the intensity of which is controlled by said modulated current, thereby producing an image of said field of view.

14. In combination, a glow discharge lamp, a source of alternating signaling current, having amplitude variations corresponding to the light signals to be produced by said lamp, connected to the electrodes of said lamp, a source of radiant energy, means for projecting through space a beam of radiant energy from said source upon said lamp at intermittent periods for causing said lamp to glow during said periods only at an intensity determined by said amplitude variations of said alternating signaling current.

15. Electro-optical image producing apparatus comprising a plurality of light sensitive, light producing electric discharge elements, a source of substantially constant radiant energy, means for energizing said elements with image signals, and a device for projecting a beam of radiant energy from said source upon said elements in succession for controlling the production of an image.

16. In combination, a lamp, a source of potential for energizing said lamp, a source of substantially constant radiant energy, and means for projecting a beam of radiant energy from said source over different paths through space periodically in succession to cause said lamp to generate light when said beam of radiant energy travels over a predetermined path.

17. In combination, a plurality of light emitting elements, a source of substantially constant radiant energy, a source of potential for energizing said elements, and means for projecting a beam of radiant energy from said source over different paths through space periodically in succession to cause said light emitting elements to generate light in succession in correspondence with the changes of the path of said beam of radiant energy.

18. Electro-optical apparatus comprising space discharge means having a plurality of pairs of electrodes forming space discharge gaps, a source of signaling potential for said discharge means, a source of radiant energy of substantially constant intensity, and means for projecting a beam of radiant energy of substantially constant intensity from said source upon said gaps in succession for decreasing the breakdown potentials thereof.

19. Electro-optical apparatus comprising a plurality of pairs of electrodes, at least one electrode of each pair being coated with a light sensitive material, a source of signaling potential for said electrodes, and means for projecting a beam of radiant energy of substantially constant intensity upon said pairs of electrodes in succession for changing the electrical conductivity between adjacent electrodes.

20. Image producing apparatus comprising a device having spaced electrodes between which an electric discharge can take place to produce radiant energy the quantity of which can be given various values between fixed limits, and means for energizing said device to cause it to radiate energy to produce an optical image, said means comprising means for impressing electric energy on said electrodes and means comprising a source of substantially constant radiant energy for simultaneously projecting radiant energy through space into the gap between said electrodes to initiate an electric discharge, said electric energy being modulated to produce the desired quantity of radiation from said device.

21. Image producing apparatus comprising a light producing device, and means for causing said light producing device to generate different amounts of light at different portions thereof and to emit said light to control the production of an image, said means comprising means for impressing upon said device image potentials having variations produced as the result of scanning a field of view an image of which is to be produced, and means for projecting upon different portions of said device in succession from a single region spaced from said device energy having electrical property in the form of a beam directed in succession from said region toward said portions, said energy being capable of varying the electrical properties of said portions.

22. An image producing device comprising a bank of pairs of electrodes, means for simultaneously applying the same image potential to all of said pairs of electrodes, and means for supplying energy not representative of the object an image of which is to be produced to said device to cause a lowering of the breakdown potential of said pairs of electrodes in succession.

23. Image producing apparatus comprising a light producing device having a plurality of electrodes forming a plurality of gaseous discharge gaps one for each elemental area of an image, and means for causing said light producing device to produce an image, said means comprising means for impressing image potentials across all of said discharge gaps simultaneously, and means for reducing the break-down potential of said discharge gaps in succession.

WALTER F. KANNENBERG.